(12) United States Patent
Martin et al.

(10) Patent No.: US 11,742,734 B2
(45) Date of Patent: Aug. 29, 2023

(54) PERMANENT MAGNET MACHINE AND ROTOR THEREFOR

(71) Applicant: ABB Schweiz AG, Baden (CH)

(72) Inventors: William E. Martin, Greenville, SC (US); Robert F. McElveen, Jr., Anderson, SC (US); Nicolas W. Frank, Greer, SC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/378,932

(22) Filed: Jul. 19, 2021

(65) Prior Publication Data

US 2023/0018320 A1    Jan. 19, 2023

(51) Int. Cl.
*H02K 1/276* (2022.01)
*H02K 1/27* (2022.01)
*H02K 21/16* (2006.01)
*H02K 21/04* (2006.01)

(52) U.S. Cl.
CPC ............ *H02K 21/16* (2013.01); *H02K 1/27* (2013.01); *H02K 21/04* (2013.01)

(58) Field of Classification Search
CPC ............ H02K 21/16; H02K 1/27; H02K 1/04; H02K 21/00; H02K 21/46
USPC ................................................. 310/156
See application file for complete search history.

(56) References Cited

U.S. PATENT DOCUMENTS

| | | | | |
|---|---|---|---|---|
| 6,566,778 | B1* | 5/2003 | Hasegawa | H02K 1/165 310/211 |
| 7,851,962 | B1* | 12/2010 | Williams | H02K 16/04 310/212 |
| 2007/0007842 | A1* | 1/2007 | Shim | H02K 19/08 310/216.073 |
| 2010/0301697 | A1* | 12/2010 | Takahashi | H02K 1/2766 310/156.53 |

(Continued)

FOREIGN PATENT DOCUMENTS

| | | |
|---|---|---|
| DE | 10261762 B4 | 10/2005 |
| WO | WO 2015/171486 A1 | 11/2015 |
| WO | WO 2018/099632 A1 | 6/2018 |

OTHER PUBLICATIONS

European Patent Office, Extended European Search Report in European Patent Application No. 22185687.5, 11 pp. (dated Dec. 2, 2022).

*Primary Examiner* — Ahmed Elnakib
*Assistant Examiner* — Masoud Vaziri
(74) *Attorney, Agent, or Firm* — Leydig, Voit & Mayer, Ltd.

(57) ABSTRACT

An electric machine includes a stator and a rotor. The rotor includes stacked laminations forming a rotor core. The rotor rotates relative to the stator about a central axis. The rotor core has an outer diameter. Each lamination includes a plurality of magnet slots. Each magnet slot includes a ferrite permanent magnet located therein, adjacent pairs of the ferrite permanent magnets defining a number of poles. Each of the laminations includes a plurality of non-circular rotor (Continued)

bar apertures spaced about the central axis of the rotor and disposed adjacent to and radially inward of the rotor outer diameter. A non-cylindrical rotor bar is disposed in each respective of the plurality of rotor bar apertures. The rotor bars are formed of a conductive material, wherein at least some of the plurality of rotor bars collectively form a rotor bar cage.

18 Claims, 6 Drawing Sheets

(56) References Cited

U.S. PATENT DOCUMENTS

| | | | |
|---|---|---|---|
| 2011/0030419 A1* | 2/2011 | Kikuchi | H02K 21/46 62/498 |
| 2014/0283373 A1* | 9/2014 | Melfi | H02K 1/223 29/598 |
| 2014/0306565 A1* | 10/2014 | James | H02K 17/185 310/90 |
| 2015/0035389 A1* | 2/2015 | Lee | H02K 19/103 310/46 |
| 2017/0271930 A1* | 9/2017 | Lee | H02K 1/223 |
| 2018/0212501 A1* | 7/2018 | Mayor | H02K 17/185 |
| 2020/0313527 A1* | 10/2020 | Kim | H02K 17/185 |

* cited by examiner

PERMANENT MAGNET MACHINE AND ROTOR THEREFOR

BACKGROUND

Recently, the trend toward and increasing requirements of higher efficiency systems have caused a substantial impact on electric motor design. Designers have been challenged to change approaches to motor topologies to provide the specified values of higher efficiency classes (such as IE3, IE4, IE5). Line-start interior permanent magnet synchronous motors (LSIPMSM) are strong candidates for higher efficiency class general purpose motors due to their higher power factor values.

Reaching higher efficiency classes requires highly optimized motor design and the careful use of materials. In one example, the use of strong magnets in interior permanent motors is considered critical to achieving efficiency levels beyond what is practical for induction motors. However, magnets used in such designs are typically rare earth magnets, which are considered strategically important, and are correspondingly expensive.

The present disclosure is directed to an improved rotor for a permanent magnet machine that satisfies both efficiency goals and the desire to do so with widely available, and more cost-effective, ferrite magnets.

BRIEF SUMMARY

The disclosure describes an electric machine including a stator defining a rotor chamber and a rotor disposed within the stator chamber. The rotor includes a plurality of generally similar laminations stacked end-to-end to form a rotor core. The rotor is configured to rotate relative to the stator about a central axis. The rotor core has an outer diameter. Each of the laminations includes a plurality of magnet slots that are radially spaced apart from the outer diameter and angled inwardly with one end of each magnet slot adjacent to the outer diameter. Each magnet slot includes a ferrite permanent magnet disposed therein. Adjacent pairs of the ferrite permanent magnets define poles for the rotor. Each of the laminations includes a plurality of non-circular rotor bar apertures spaced about the central axis of the rotor core, each of the non-circular rotor bar apertures disposed radially inward of the rotor core outer diameter. The plurality of non-circular rotor bar apertures include conductive material forming rotor bars, the rotor bars collectively forming a rotor bar cage, wherein at least some of the plurality of rotor bars are non-round and are sized and shaped and located such that the electric machine has at least 20% fewer losses than a machine meeting IE4 efficiency level as defined by IEC 60034-30-1. End members are disposed on axial opposite ends of the rotor, the end members being in electrical contact with the rotor bars.

These and other features will be apparent from the following detailed description and accompanying drawings.

DETAILED DESCRIPTION

Figure 1:
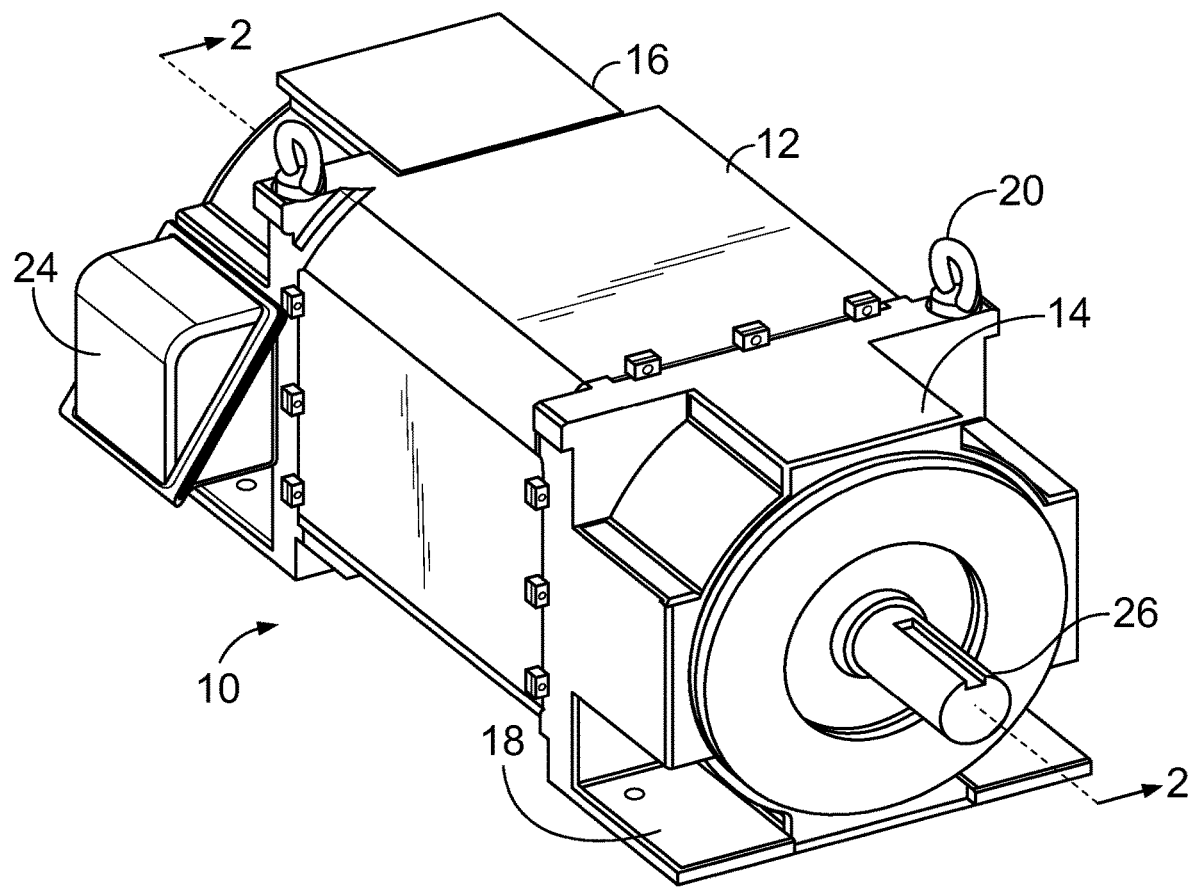
FIG. 1 is a perspective view of a line start permanent magnet motor (a LSIPM motor).

Now referring generally to the figures where, whenever possible, like reference numbers will refer to like elements, there is illustrated in FIG. 1 an exemplary electric motor 10. In the embodiment illustrated, the motor 10 comprises a line start permanent magnet motor that is designed to use ferrite magnets and operates at high efficiency and the ability to produce sufficient torque at start up to start the motor under load. The motor design is optimized so as to not require any additional active material beyond that of a conventional induction motor.

The exemplary motor 10 comprises a frame 12 capped at each end by drive and opposite drive end caps 14, 16, respectively. The frame 12 and the drive and opposite drive end caps 14, 16 cooperate to form the enclosure or motor housing for the motor 10. The frame 12 and the drive and opposite drive end caps 14, 16 may be formed of any number of materials, such as steel, aluminum, or any other suitable structural material. The drive and opposite drive end caps 14, 16 may include mounting and handling features, such as the illustrated mounting feet 18 and eyehooks 20.

To induce rotation of the rotor, current is routed through stator windings disposed in the stator. (See FIG. 2). Stator windings are electrically interconnected to form groups as is known. The stator windings are further coupled to terminal leads (not shown), which electronically connect the stator windings to an external power source (not shown), as is known. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A rotor shaft 26 coupled to the rotor rotates in conjunction with the rotor about a center axis 28. That is, rotation of the rotor translates into a corresponding rotation of the rotor shaft 26. As appreciated by those of ordinary skill in the art, the rotor shaft may couple to any number of drive machine elements, thereby transmitting torque to the given drive machine element. By way of example, machines such as pumps, compressors, fans, conveyors, and so forth, may harness the rotational motion of the rotor shaft 26 for operation.

Figure 2:
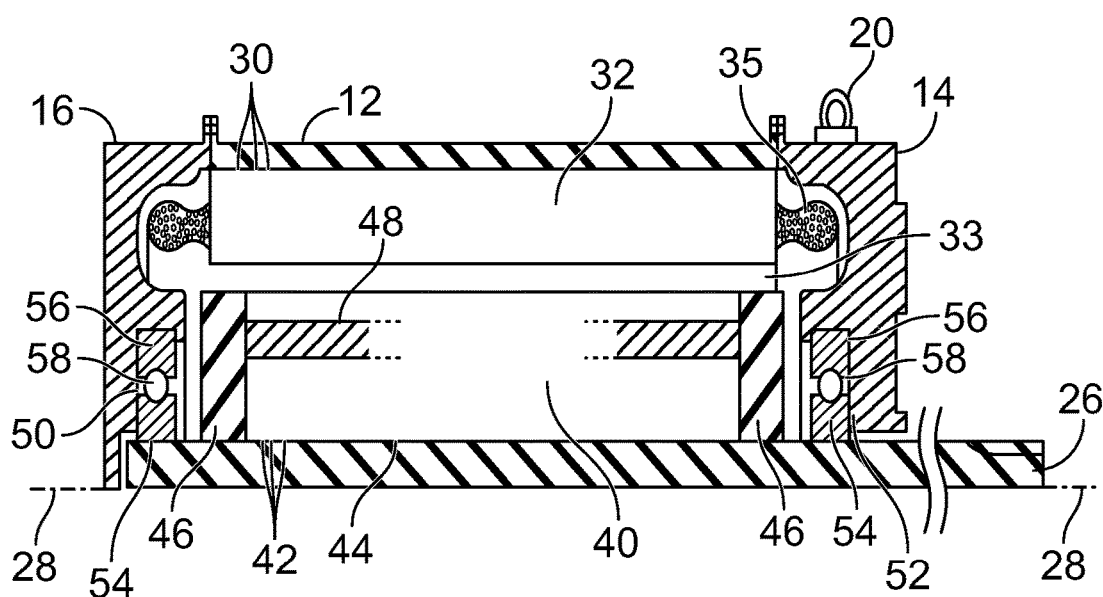
FIG. 2 is a partial cross-section view of the motor of FIG. 1 along plane 2-2 of FIG. 1.
Figure 3:
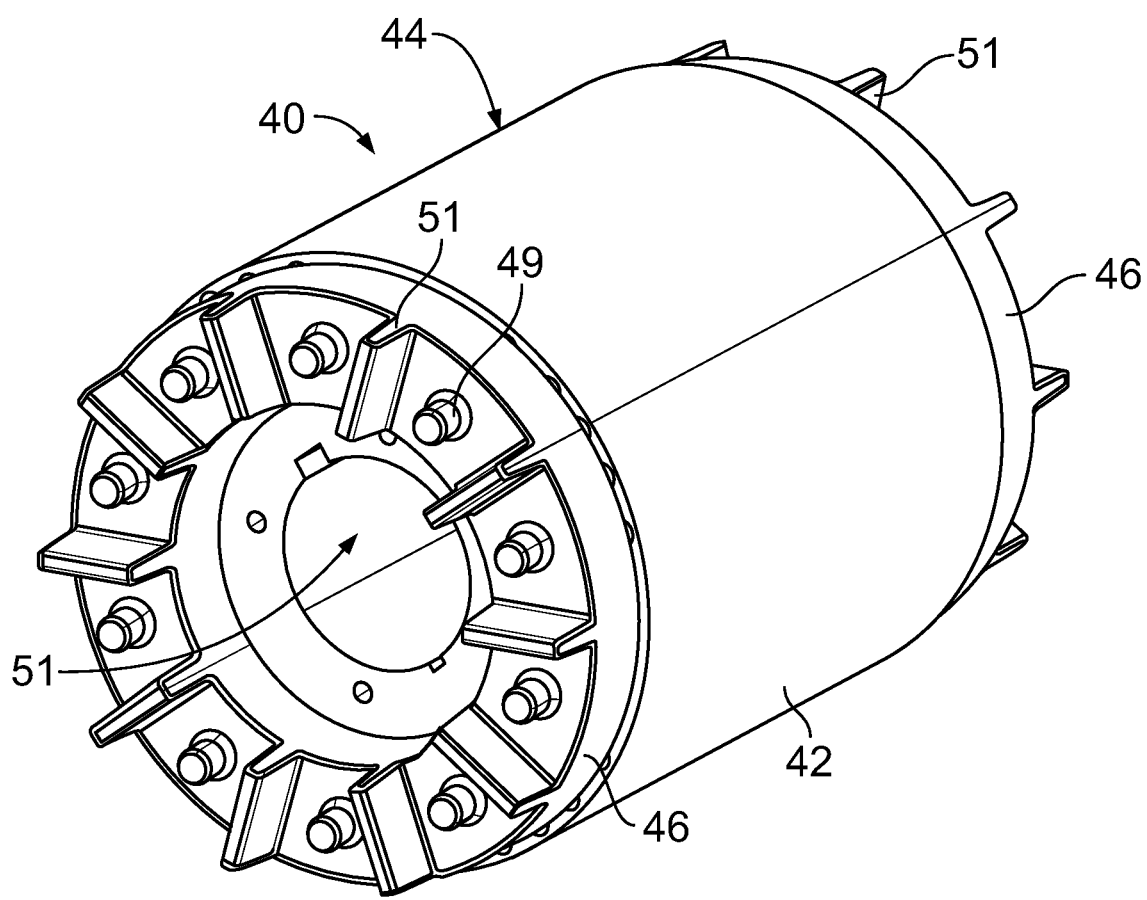
FIG. 3 is a perspective view of a rotor for the motor of FIG. 1.
Figure 4:
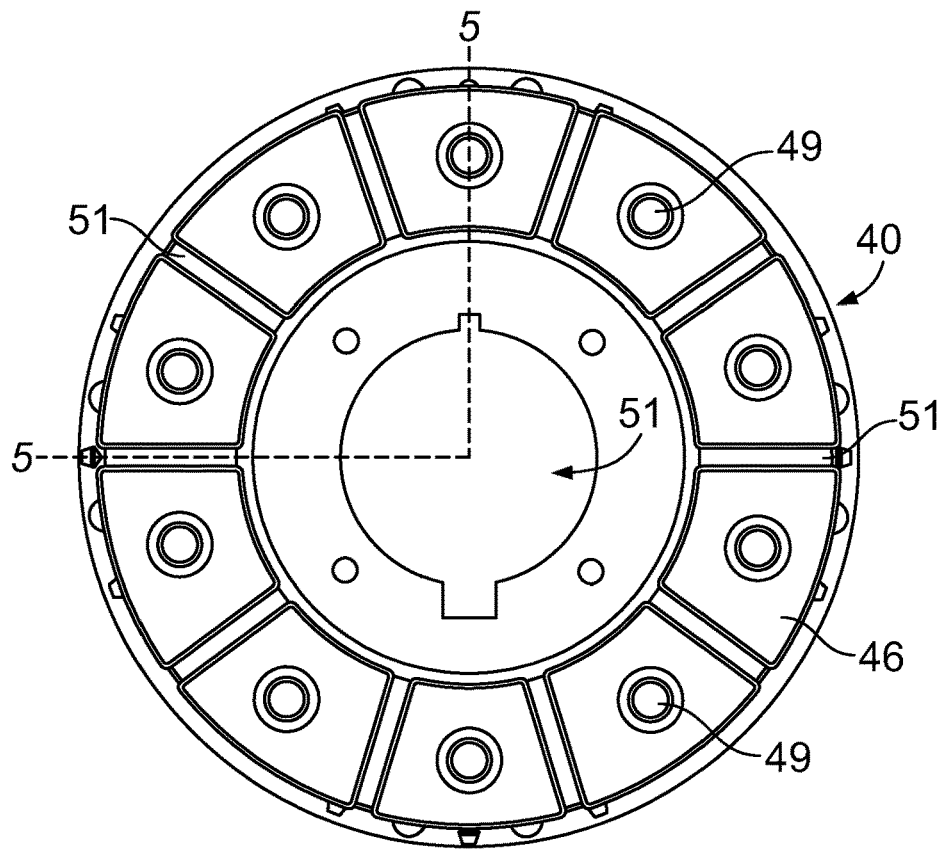
FIG. 4 is an end view of the rotor of FIG. 3.
Figure 5:
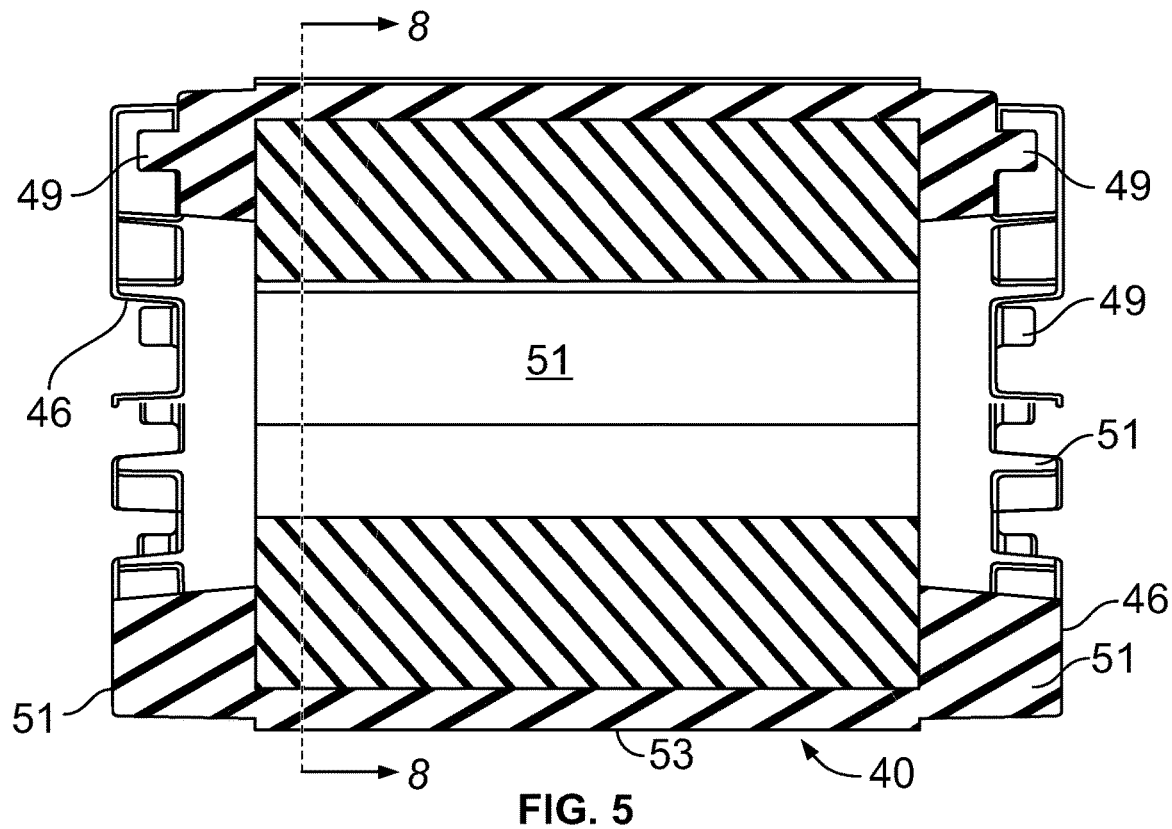
FIG. 5 is a longitudinal sectional view along 5-5 of the rotor of FIG. 4.

FIG. 2 is a partial cross-sectional view of the motor 10 of FIG. 1 along plane 2-2 of FIG. 1. To simplify the discussion, only the top portion of the motor 10 is shown, as the structure of the motor 10 is essentially mirrored along its centerline. As discussed above, the frame 12 and the drive and opposite drive end caps 14, 16 cooperate to form an enclosure or motor housing for the motor 10. Within the enclosure or motor housing resides a plurality of stator laminations 30 placed next to and aligned with one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 33 that extends the length of the stator core 32 and that is sized to receive a rotor allowing for a specified air gap.

Referring also to FIGS. 2-8, the rotor assembly 40, which may be a cast aluminum assembly, resides within the rotor chamber 34, and similar to the stator core 32, the rotor assembly 40 comprises a plurality of rotor laminations 42 aligned and adjacently placed with respect to one another to form a contiguous rotor core 44. End members 46 are disposed on opposite ends of the rotor core 44 and may be generally circular in cross-section with an outer diameter that generally approximates the diameter of the rotor laminations 42. End members 46 each include a plurality of sprues 49, which may be equally distributed in a circle for balancing the rotor assembly 40. In between adjacent pairs of the sprues 49 are axially extending fins 51 which function to dissipate heat. The end members 46 may constitute part of a squirrel cage 53 of the rotor assembly 40 configured to enable line start functionality of the motor 10.

To support the rotor assembly 40, the exemplary motor 10 includes drive and opposite drive bearing sets 50, 52, respectively, that are secured to the rotor shaft 26 and that facilitate rotation of the rotor assembly 40 within the stationary stator core 32. During operation of the motor 10, the bearing sets 50, 52 transfer the radial and thrust loads produced by the rotor assembly 40 to the motor housing. Each bearing set 50, 52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50, 52 also includes an outer race 56 and rotational elements 58, which are disposed between the inner and outer races 54, 56. The rotational elements 58 facilitate rotation of the inner races 54 while the outer races 56 remain stationary and mounted with respect to the drive and opposite drive end caps 14, 16. Thus, the bearing sets 50, 52 facilitate rotation of the rotor assembly 40 while supporting the rotor assembly 40 within the motor housing, i.e., the frame 12 and the drive and opposite drive end caps 14, 16. To reduce the coefficient of friction between the races 54, 56 and the rotational elements 58, the bearing sets 50,52 are coated with a lubricant. Although the drawings show the bearing sets 50, 52 with balls as rotational elements, the bearing sets may be other constructions, such as sleeve bearings, pin bearings, roller bearings, etc.

When assembled, the rotor laminations 42 cooperate to form a shaft chamber 51 located in the center of the lamination 42 that extends through the center of the rotor core 44 and that is configured to receive the rotor shaft 26 therethrough. The rotor shaft 26 is secured with respect to the rotor core 44 such that the rotor core and the rotor shaft rotate as a single entity about the rotor center axis 28, and in one example, via a spline and keyway arrangement as is known. As described below in greater detail, in each lamination, magnet slots, and in the case of the LSIPM, rotor bar slots, may also cooperate to form passages extending through the rotor core 44.

Figure 6:
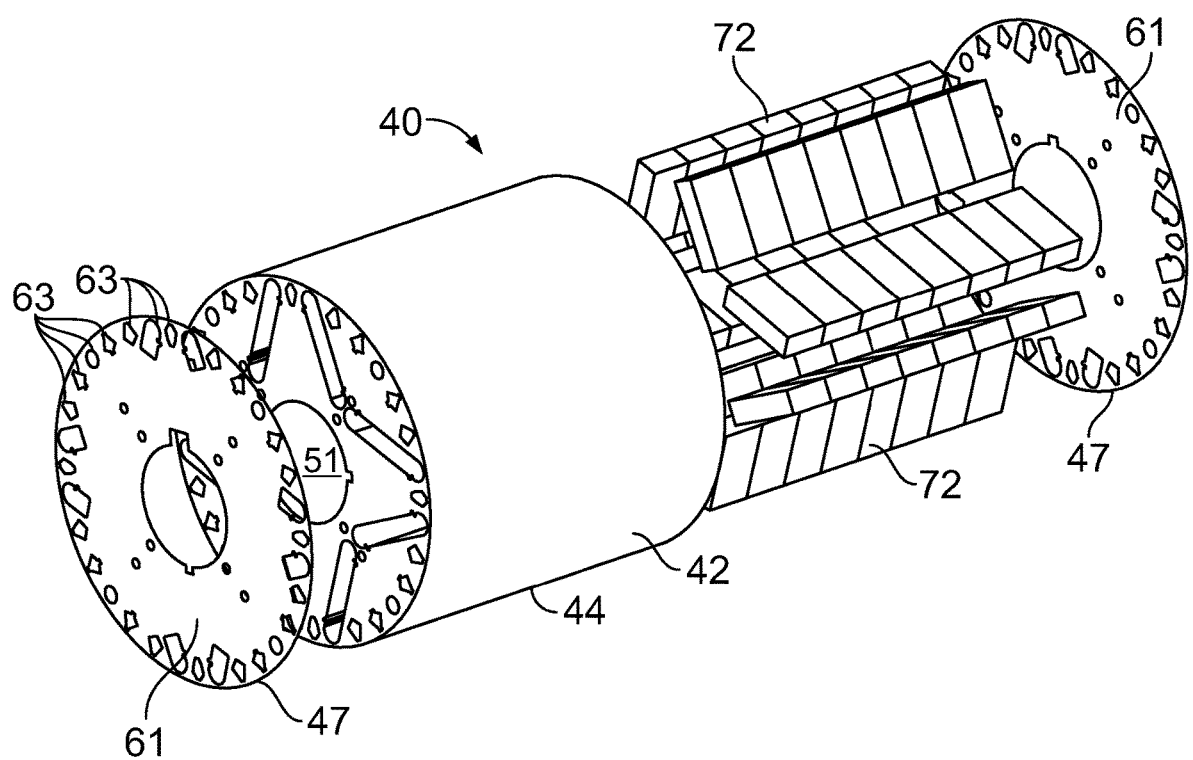
FIG. 6 is an exploded view of part of a rotor.
Figure 7:
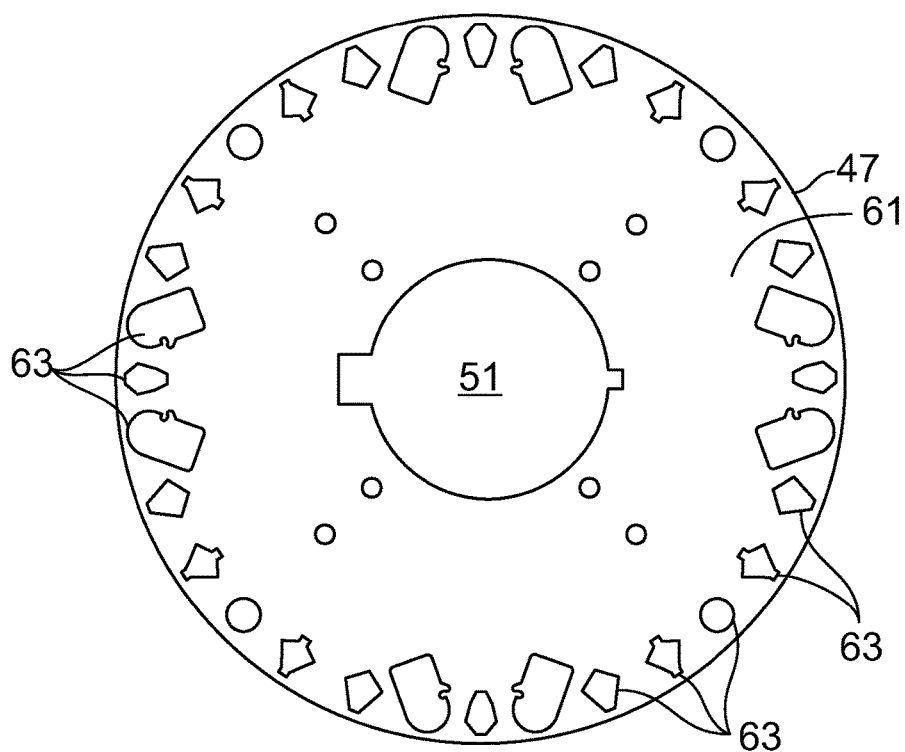
FIG. 7 is an end lamination of the rotor of FIG. 6.
Figure 8:
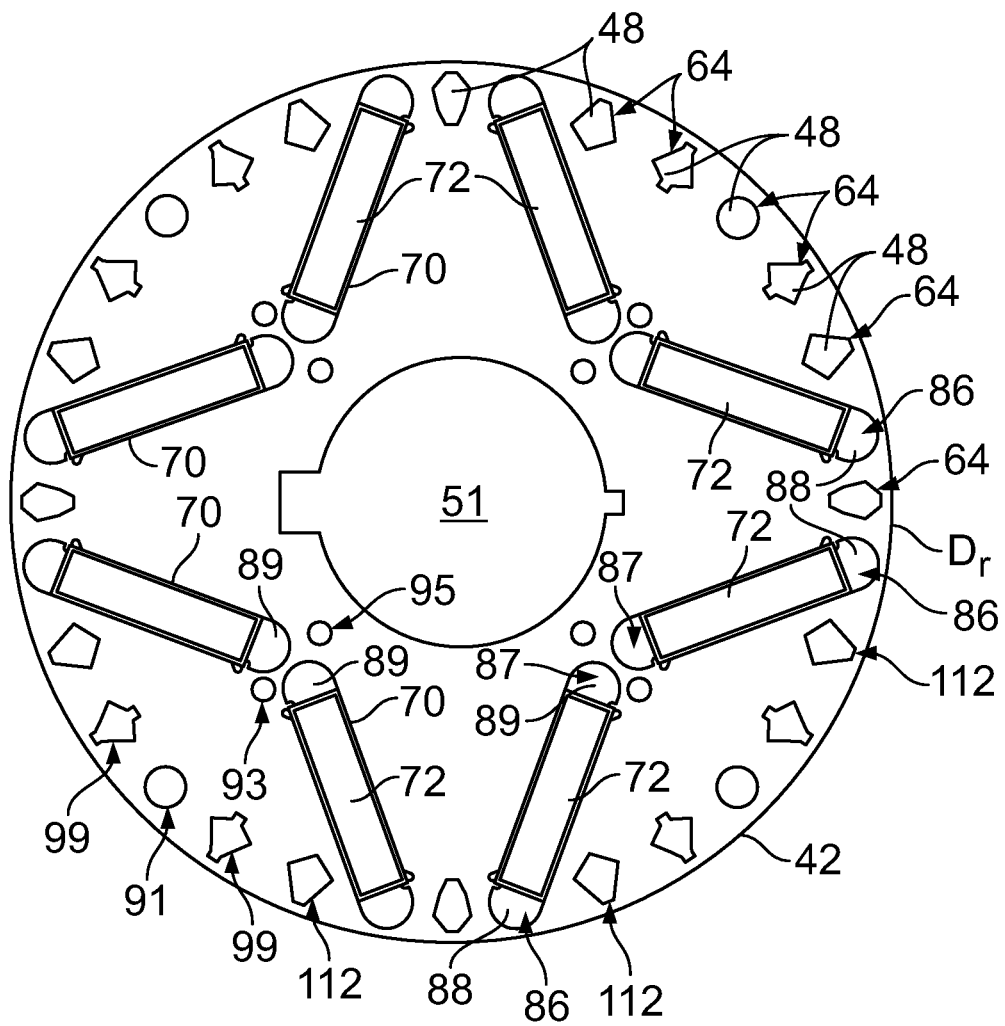
FIG. 8 is a rotor core lamination showing the positions of the interior magnets and shapes and position of associated structure along 8-8 of the rotor of FIG. 5.

Referring to FIGS. 6-8, each rotor lamination 42 has a generally circular cross-section and is formed of electrical steel. Extending from end-to-end, i.e., transverse to the cross-section, each lamination 42 includes features that, when aligned with adjacent laminations 42, form cumulative features that extend axially through the rotor core 44.

As shown in FIGS. 6 and 7, two end rings, also known as end laminations 47, are respectively each positioned at opposite ends of the stack of laminations 42 to provide a cap for the rotor core 44. The end laminations 47 are positioned axially inside end members 46. Each end lamination 47 is formed of an end lamination web 61 that has a plurality of rotor bar openings or rotor bar slots 63 that are shaped and sized to receive rotor bars, or similar structures. However, the end laminations 47 are formed without openings corresponding to the position of magnets 72. It will be understood that the end laminations 47 are considered optional for the functioning of the motor 10 but assist, during the manufacturing process, to retain magnets 72 in the rotor core 44 during manufacturing of the rotor assembly 40, while permitting rotor bars to be placed or cast into the rotor core as is known through the openings 63.

Figure 9:
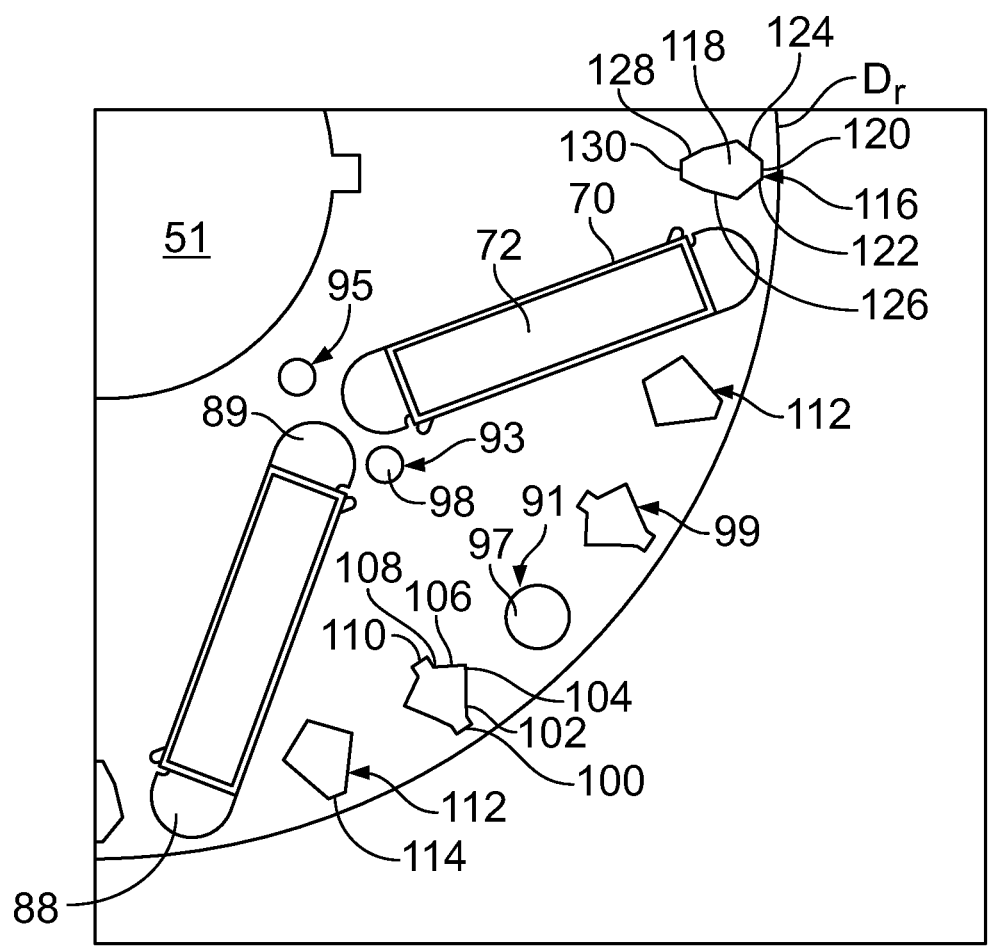
FIG. 9 is a close up view of a portion of the rotor core lamination shown in FIG. 8.

FIGS. 8 and 9 provide further detail of illustrative embodiments of the rotor laminations 42 according to the present disclosure. Each rotor lamination 42 has a generally circular cross-section and is formed of a magnetic material, such as electrical steel. Each lamination may be any suitable thickness, for example from about 0.018-0.025" in axial thickness. Extending from end-to-end, i.e., transverse to the cross-section, each lamination 42 includes features that, when aligned with adjacent laminations 42, form cumulative features that extend axially through the rotor core 44. For example, each exemplary rotor lamination 42 has a circular shaft aperture 62 located in the center of the lamination 42 as noted above. The shaft apertures 62 of adjacent laminations 42 cooperate to form a shaft chamber 51 configured to receive the rotor shaft 26 (see FIG. 2) therethrough. The rotor core has an outer diameter ("$D_r$").

Additionally, each lamination 42 includes a series of rotor bar slots 64 that are arranged at positions about the lamination such that when assembled, the rotor bar slots cooperate to form channels for the rotor bars that extend through the rotor core 44. Some of the rotor bar slots are spaced radially inward from and adjacent to the rotor outer diameter ($D_r$) and some of the rotor bar slots are spaced radially inwardly a greater extent as will be explained more fully below. As shown in the drawings, each of the rotor bar slots 64 may extend radially outward to generally the same radial position relative to the rotor outer diameter ($D_r$), or one or more rotor bar slots may extend radially outward and terminate at different radial distances relative to the outer diameter ($D_r$), depending upon the application. The rotor bars 48 may present the same shape as the rotor bar slots 64 to provide a tight fit for the rotor bars 48 within the rotor channels. The rotor bars may be manufactured with tight tolerances between the rotor bars 48 and the rotor bar slots, for instance, for a fabricated/swaged rotor bar design. Furthermore, the rotor bars 48 may be cast into the channels of the assembled lamination stack. The rotor bars 48 may be made of aluminum or any suitable conductive material. It will be understood that rotor bars fitted to circular apertures will be cylindrical with a round cross section and rotor bars fitted to non-circular apertures will not be round in cross section.

Additionally, the rotor laminations 42 include magnet slots 70. Ferrite magnets 72 may be disposed in the magnet slots form poles for the rotor. The magnet slots may be arranged so the magnets are in a single layer or multi-layers. The magnet slots may also be arranged so the magnets form a conventional "V"- or "U"-shape. There may be only one magnet per slot or multiple magnets per slot 70. The magnets 72 may be magnetized in a generally radial direction to establish alternately inwardly and outwardly disposed north and south poles on adjacent magnets. This means that adjacent magnets cooperate to establish alternate north and south poles on the periphery of the rotor as is known. The rotor may be constructed with any even number of poles. An exemplary lamination for a four pole motor is shown in FIG. 8. The general magnetization and saturation established by the magnets are well understood and so will not be discussed herein.

The magnet slots 70 extend to the peripheral edge of the rotor such that a radially outward end of the magnet slot is adjacent the peripheral edge ($D_r$). One or more of the magnet slots 70 may have its radially outward end at generally the same radial position relative to the rotor outer diameter ($D_r$) as the rotor bar slots as shown in the drawings, or one or more magnet slots may extend radially outward and terminate at different distances relative to each other and/or the rotor bar slots, depending upon the application. In the illustrated embodiment, the magnet slots 70 terminate at the same distance from the peripheral edge of the lamination as that of the outer ring of the rotor bar slots 64 so as to maximize the magnetic effect generated by the ferrite magnets 72.

The ferrite magnets 72 disposed in the magnet slots have a smaller longitudinal length in the direction of the magnet slots than the magnet slots such that the magnet when installed in the magnet slot forms an outer magnet slot aperture 86, which is free of magnet material, i.e., magnet-free, between the end of each permanent magnet and the magnet slot adjacent the peripheral edge of the lamination and an inner magnet slot aperture 87, which is free of magnetic material, i.e., magnet-free, between the end of each permanent magnet and the magnet slot radially inwardly of each magnet. In one embodiment, the outer magnet slot aperture 86 is filled with a substantially semicircular or "D" shaped rotor bar 88 or with rotor bar material and the inner magnet slot aperture 87 is unfilled. In an alternative embodiment, the outer magnet slot aperture 86 is filled with a substantially semicircular or "D" shaped rotor bar 88 or rotor bar material and the inner magnet slot aperture 87 is also filled with a substantially semicircular or "D" shaped rotor bar 89 or rotor bar material.

Each of the pairs of ferrite magnets 72 form a pole, in the illustrated example, each of the "V" shaped pairs of magnets, creates, for example, an angle of about 131 degrees. Other angles of the ferrite magnets 72 are contemplated with the goal of keeping the magnets as close as practicable to the outer diameter ($D_r$) to maximize the effect thereof.

The magnet angle may correspond to the angle formed between the edges of adjacent magnet slots 70. The magnet angle may also correspond to an angle between reference lines passing through points on adjacent magnets where the pole of each magnet changes direction. For instance, adjacent magnets may have a north pole on one side of each of the magnets and a south pole on another side of each of the magnets. The magnet angle may correspond to the angle between a first reference line passing through a center plane of one magnet where the poles switch direction and a second reference line passing through a center plane of an adjacent magnet where the poles switch direction. The magnets 72 may be rotationally symmetrically disposed about the axis of rotation and generally define the poles of the motor. Depending on the number of poles, the magnets 72 may be disposed in different repetition patterns, such as at intervals of 180 degrees, 60 degrees, 45 degrees, etc., for example. The magnets may be magnetized in a generally radial direction to establish inwardly and outwardly disposed north and south poles on the magnets. This means that adjacent magnets cooperate to establish alternate north and south poles on the periphery of the rotor. The rotor may be constructed with any even number of poles. The angle between the magnets of a pole, along with other parameters, generally defines the pole width. The magnet angle may be obtuse, for example, approximately 109, 111, 113, 115, 117, 119, 121, 123, 125, 127, 129, 131, 133, or 135 degrees. Alternatively, or additionally, the width of the magnets may be selected to achieve a desired pole width. While the widths and edges of the poles generally correspond with the angular positions of edges of the magnets, the width and edges of a pole are not exclusively a function of the size of the permanent magnets associated with the pole.

Each of the pairs of ferrite magnets 72 is bisected by a set of circular apertures that lie in a line extending radially from the central axis of the rotor. The radially most outward of the apertures is a first circular aperture 91 comprising rotor bar material, which is radially spaced the same distance from the periphery of the rotor lamination 42 as that of the outer magnet slot aperture 86 and positioned halfway between the outer magnet slot apertures 86 of the pair of ferrite magnets 72 that form a pole. Since the lamination 42 shown is that of a four pole rotor, there are four first circular apertures 91.

Second circular apertures 93 comprising rotor bar material are formed in the lamination 42 adjacent to and just radially outward of each adjacent pair of inner magnet apertures 87. A third circular aperture 95 is formed in the lamination 42 adjacent to and just radially inward of each adjacent pair of inner magnet apertures 87. In one embodiment, the first and second circular apertures 91, 93 are filled with circular rotor bars 97, 98 or rotor bar material and the third circular apertures are left unfilled. The third circular aperture 95 functions to pinch the flux.

Flanking each of the first circular apertures 91 is a pair of fourth apertures 99, which may also be referred as a first pair of flanking apertures comprising rotor bar material, each of the pair disposed on opposite sides of the first circular aperture. The fourth apertures 99 are spaced radially the same distance from the periphery of the rotor lamination 42 as that of the first circular apertures. The fourth apertures 99 are non-circular. Specifically, the fourth apertures 99 have a shape as follows: an outer side 100 positioned adjacent to and substantially parallel to the peripheral edge of the rotor lamination, two first planar shoulders 102 diverging in opposite directions at a first angle, two second planar shoulders 104 diverging at a second angle from the angle of the first planar shoulders, two third planar converging sides 106, which angle inwardly, two fourth converging sides 108, which form an angle with the third sides, and at an innermost position, an inner edge 110, which is parallel to the outer edge 100 and of approximately of the same length relative to the outer edge. The first shoulders 102 and the fourth sides 108 are approximately of the same length and the second shoulders 104 and the fourth sides 108 are approximately of the same length.

A pair of fifth apertures 112 are spaced radially the same distance from the periphery of the rotor lamination 42 as that of the first circular apertures and the fourth apertures 99. The fifth apertures 112 are non-circular and may also be referred as a second pair of flanking apertures comprising rotor bar material, each of the pair disposed on opposite sides of the first pair of flanking apertures 99. Specifically, the fifth apertures 112 are diamond shapes with a truncated outer edge 114.

Between the "V" of each polar group of magnets 72 is a group or set of rotor bar apertures, and each provided with a rotor bar or rotor bar material, the group or set comprising, in an equally spaced apart configuration, a first circular aperture 91, a pair of non-circular fourth apertures 99, the pair of fourth apertures positioned on opposite sides of the first circular aperture, and a pair of non-circular fifth apertures 112, with the pair of fifth apertures positioned on opposite sides of the fourth apertures. The rotor bars are made of conductive material, such as aluminum.

Between each of the pairs of polar magnet groups, one such pair of magnets depicted in detail in FIG. 9, is a sixth aperture 116 comprising rotor bar material positioned at the same distance from the outer diameter ($D_r$) as that of the first, fourth, and fifth apertures 91, 99, 112. The sixth aperture 116 is also non-round. Generally, the sixth aperture 116, also provided with a rotor bar 118 or rotor bar material, is ovate with planar sides as follows: an outer side 120 is positioned adjacent to and substantially parallel to the peripheral edge ($D_r$) of the rotor lamination, two first planar shoulders 122 diverging in opposite directions at a first angle, two second planar shoulders 124 diverging at a second angle from the angle of the first planar shoulders, two third planar converging sides 126, which angle inwardly, two fourth converging sides 128, which form an angle with the third sides, and at an innermost position, an inner edge 130, which is parallel to the outer side 120 and of approximately of the same length relative to the outer side. Since the rotor depicted is a four pole design, there are four sixth apertures 116.

The rotor bars 48 therefore have a different size, shape, and spacing from rotor bars found in a machine having a uniform cage. Additionally, the rotor bar slots 64 may be distributed about the rotor in a manner that is asymmetric rather than evenly distributed, i.e., asymmetric rather than equiangularly spaced, around the outer edge of the lamination surface. The laminations shown in FIG. 8 is configured to optimize paths for flux over a range of conditions that permit the use of ferrite magnets.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An electric machine comprising:
    a stator defining a rotor chamber, and
    a rotor disposed within the stator chamber, the rotor comprising a plurality of generally similar laminations stacked end-to-end to form a rotor core, the rotor configured to rotate relative to the stator about a central axis, the rotor core having an outer diameter;
    wherein each of the laminations includes a plurality of magnet slots that are radially spaced apart from the outer diameter and angled inwardly with one end of each magnet slot adjacent to the outer diameter, each magnet slot comprising a ferrite permanent magnet disposed therein, adjacent pairs of the ferrite permanent magnets defining poles for the rotor;
    wherein each of the laminations includes, for each pair of ferrite permanent magnets, a first, a second, and a third aperture lying sequentially along a bisecting line that extends radially inward toward the central axis and bisects the respective pair of ferrite permanent magnets, the first, second, and third apertures being circular, the first and second apertures being filled with conductive material to form circular rotor bars;
    wherein each of the laminations includes a plurality of non-circular rotor bar apertures spaced about the central axis of the rotor core, each of the non-circular rotor bar apertures disposed radially inward of the rotor core outer diameter;
    wherein the plurality of non-circular rotor bar apertures comprise, for each pair of ferrite permanent magnets, a pair of fourth apertures disposed on opposite sides of the respective bisecting line, a pair of fifth apertures disposed on opposite sides of the respective bisecting line, and a sixth aperture disposed between adjacent pairs of ferrite permanent magnets, each non-circular rotor bar aperture being filled with the conductive material to form rotor bars; and
    end members disposed on axial opposite ends of the rotor, the end members being in electrical contact with the rotor bars.

2. The machine of claim 1 wherein the machine is a line start permanent magnet motor.

3. The machine of claim 2 wherein the motor is a four pole motor and the adjacent pairs of the ferrite permanent magnets defining the four poles of the rotor are arranged in a "V" shape.

4. The machine of claim 3 wherein each of the adjacent pairs of the ferrite permanent magnets defining "V" shape are angled with respect to each other at an outward facing angle greater than 90 degrees and less than 180 degrees.

5. The machine of claim 3 wherein each magnet slot comprises two opposite ends which define inner and outer magnet free areas, the outer magnet free areas adjacent the rotor outer diameter and the inner magnet free areas radially inwardly positioned relative the rotor core outer diameter.

6. The machine of claim 5 wherein each outer magnet free area is provided with rotor bar material or both the outer magnet free area and the inner magnet free area is provided with rotor bar material.

7. The machine of claim 6 wherein the first, fourth, fifth, and sixth apertures are disposed a radial distance from the central axis substantially the same as that of the outer magnet free areas of the magnet slots and provided in an odd number.

8. The machine of claim 7 wherein each fourth aperture comprises a fourth shape comprising an outer side positioned adjacent to and substantially parallel to a peripheral edge of the lamination, two first planar shoulders diverging in opposite directions at a first angle, two second planar shoulders diverging at a second angle from the angle of the first planar shoulders, two third planar converging sides that angle inwardly, two fourth converging sides that form an angle with the third sides, and at an innermost position of each fourth aperture, an inner edge that is parallel to and approximately equal in length to the outer side, the first shoulders and the fourth sides being approximately equal in length and the second shoulders and the fourth sides being approximately equal in length.

9. The machine of claim 8 wherein each fifth aperture comprises a fifth shape comprising a diamond shape with a truncated outer edge, each pair of fifth apertures disposed on opposite sides of the respective pair of fourth apertures.

10. The machine of claim 9 wherein each sixth aperture comprises an ovate shape with planar sides including a sixth outer side positioned adjacent to and substantially parallel to the peripheral edge of the lamination, two sixth planar shoulders diverging in opposite directions at a sixth angle, two seventh planar shoulders diverging at a seventh angle from the angle of the sixth planar shoulders, two eighth planar converging sides that angle inwardly, two ninth converging sides that form an angle with the eighth sides, and at an sixth innermost position, a sixth inner edge that is parallel to and approximately equal in length to the sixth outer side.

11. A rotor for a line start permanent magnet motor, the rotor comprising:
a plurality of generally similar laminations stacked end-to-end to form a rotor core having an outer diameter;
wherein each of the laminations includes a plurality of magnet slots that are radially spaced apart from the outer diameter and angled inwardly with one end of each magnet slot adjacent to the outer diameter, each magnet slot comprising a ferrite permanent magnet disposed therein, adjacent pairs of the ferrite permanent magnets defining poles for the rotor;
wherein each of the laminations includes, for each pair of ferrite permanent magnets, a first, a second, and a third aperture lying sequentially along a bisecting line that extends radially inward toward the central axis and bisects the respective pair of ferrite permanent magnets, the first, second, and third apertures being circular, the first and second apertures being filled with conductive material to form circular rotor bars;
wherein each of the laminations includes a plurality of non-circular rotor bar apertures spaced about the central axis of the rotor core, each of the non-circular rotor bar apertures disposed radially inward of the rotor outer diameter;
wherein the plurality of non-circular rotor bar apertures comprise, for each pair of ferrite permanent magnets, a pair of fourth apertures disposed on opposite sides of the respective bisecting line, a pair of fifth apertures disposed on opposite sides of the respective bisecting line, and a sixth aperture disposed between adjacent pairs of ferrite permanent magnets, each non-circular rotor bar aperture being filled with the conductive material to form rotor bars; and
end members disposed on axial opposite ends of the rotor, the end members being in electrical contact with the rotor bars.

12. The rotor of claim 11 wherein the adjacent pairs of the ferrite permanent magnets define four poles of the rotor and are arranged in a "V" shape and angled with respect to each other at an outward facing angle from 109 degrees to 135 degrees.

13. The rotor of claim 12 wherein each magnet slot comprises two opposite ends which define inner and outer magnet free areas, the outer magnet free areas adjacent the rotor outer diameter and the inner magnet free areas radially inwardly positioned relative the rotor core outer diameter.

14. The rotor of claim 13 wherein each outer magnet free area is provided with rotor bar material or both the outer magnet free area and the inner magnet free area is provided with rotor bar material.

15. The rotor of claim 14 wherein the first, fourth, fifth, and sixth apertures are disposed a radial distance from the central axis substantially the same as that of the outer magnet free areas of the magnet slots and provided in an odd number.

16. The rotor of claim 15 wherein each fourth aperture comprises a fourth shape comprising an outer side positioned adjacent to and substantially parallel to a peripheral edge of the lamination, two first planar shoulders diverging in opposite directions at a first angle, two second planar shoulders diverging at a second angle from the angle of the first planar shoulders, two third planar converging sides that angle inwardly, two fourth converging sides that form an angle with the third sides, and at an innermost position of each fourth aperture, an inner edge that is parallel to and approximately equal in length to the outer side, the first shoulders and the fourth sides being approximately equal in length and the second shoulders and the fourth sides being approximately equal in length.

17. The rotor of claim 16 wherein each fifth aperture comprises a fifth shape comprising a diamond shape with a truncated outer edge, each pair of fifth apertures disposed on opposite sides of the respective pair of fourth apertures.

18. The rotor of claim 17 wherein each sixth aperture comprises an ovate shape with planar sides including a sixth outer side positioned adjacent to and substantially parallel to the peripheral edge of the lamination, two sixth planar shoulders diverging in opposite directions at a sixth angle, two seventh planar shoulders diverging at a seventh angle from the angle of the sixth planar shoulders, two eighth planar converging sides that angle inwardly, two ninth converging sides that form an angle with the eighth sides, and at an sixth innermost position, a sixth inner edge that is parallel to and approximately equal in length to the sixth outer side.

* * * * *